(12) United States Patent  
Kliesch et al.

(10) Patent No.: US 7,396,587 B2  
(45) Date of Patent: Jul. 8, 2008

(54) BLACK FILM COMPRISED OF THERMOPLASTIC POLYESTER

(75) Inventors: Holger Kliesch, Ginsheim-Gustavsburg (DE); Thorsten Kiehne, Shiga (JP); Franz Hora, Kriftel (DE); Ingo Fischer, Heistenbach (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 11/407,304

(22) Filed: Apr. 18, 2006

(65) Prior Publication Data

US 2006/0246306 A1    Nov. 2, 2006

(30) Foreign Application Priority Data

Apr. 27, 2005    (DE)    ............ 10 2005 019 979

(51) Int. Cl.
*B32B 27/18* (2006.01)
*B32B 27/20* (2006.01)
*B32B 27/36* (2006.01)

(52) U.S. Cl. ............ 428/329; 428/323; 428/324; 428/328; 428/331; 428/403; 428/404; 428/480; 428/910; 106/286.1; 106/286.3; 106/387.18; 106/400; 106/415; 106/417; 106/418; 106/472; 106/463; 106/464; 106/481; 524/425; 524/430; 524/431; 524/449

(58) Field of Classification Search ............ None
See application file for complete search history.

(56) References Cited

U.S. PATENT DOCUMENTS

| | | | | |
|---|---|---|---|---|
| 3,036,889 A | * | 5/1962 | Frey | 423/152 |
| 3,836,378 A | * | 9/1974 | Hahnkamm et al. | 106/457 |
| 3,923,726 A | * | 12/1975 | Benz | 525/177 |
| 3,926,659 A | * | 12/1975 | Bernhard et al. | 106/418 |
| 4,082,905 A | * | 4/1978 | Stephan et al. | 428/842.6 |
| 4,090,888 A | * | 5/1978 | Rademachers et al. | 106/439 |
| 4,482,586 A | * | 11/1984 | Smith et al. | 215/12.2 |
| 4,631,089 A | * | 12/1986 | Rademachers et al. | 106/456 |
| 4,676,838 A | * | 6/1987 | Franz et al. | 106/415 |
| 4,701,221 A | * | 10/1987 | Brunn et al. | 106/456 |
| 4,865,898 A | | 9/1989 | Fukuda et al. | 428/141 |
| 5,310,857 A | * | 5/1994 | Jones et al. | 528/220 |
| 5,354,374 A | * | 10/1994 | Prengel | 106/459 |
| 5,356,712 A | * | 10/1994 | Hashiuchi et al. | 428/404 |
| 5,391,330 A | * | 2/1995 | Jones et al. | 264/21 |

(Continued)

FOREIGN PATENT DOCUMENTS

DE    100 43 775 A1    3/2002

(Continued)

OTHER PUBLICATIONS

Schimtz, Peter et al., "Films." Ullman's Encyclopedia of Industrial Chemistry, 5th Ed., vol. A11 (1988), pp. 85-95, 105-106, 108-110.*

*Primary Examiner*—Vivian Chen
(74) *Attorney, Agent, or Firm*—ProPat, L.L.C.

(57) ABSTRACT

This invention relates to a single- or multilayer, oriented film formed from polyester and at least one inorganic black pigment. The inventive films include at least one layer which has, alongside polyester, an amount of from 0.5 to 75% by weight of particles incorporating iron oxide as black pigment.

15 Claims, 1 Drawing Sheet

U.S. PATENT DOCUMENTS

| | | | | |
|---|---|---|---|---|
| 5,391,702 | A * | 2/1995 | Jones et al. | 528/298 |
| 5,725,944 | A * | 3/1998 | Jones et al. | 428/336 |
| 5,900,313 | A * | 5/1999 | Nishihara et al. | 428/328 |
| 2004/0130059 | A1* | 7/2004 | Kern et al. | 264/173.16 |
| 2005/0069689 | A1* | 3/2005 | Kliesch et al. | 428/220 |

FOREIGN PATENT DOCUMENTS

| | | | |
|---|---|---|---|
| EP | 0 192 485 | * | 8/1986 |
| JP | 04-145168 A | * | 5/1992 |
| JP | 2002-146236 | * | 5/2002 |

* cited by examiner

BLACK FILM COMPRISED OF THERMOPLASTIC POLYESTER

CROSS-REFERENCE TO RELATED APPLICATIONS

This application claims priority to German parent application 10 2005 019 979.8 which is hereby incorporated by reference herein in its entirety.

FIELD OF THE INVENTION

The invention relates to a single- or multilayer, oriented film comprised of a polyester and at least one inorganic black pigment.

BACKGROUND OF THE INVENTION

Black polyester films are produced industrially, comprised of carbon-black-filled polyesters, and have been described in U.S. Pat. No. 4,865,898. These films are used inter alia as non-transparent layers in composites, or elsewhere for decorative purposes.

Carbon black can achieve low transparency and a high degree of blackness especially when nanoparticulate carbon blacks or graphites are used.

However, carbon blacks and graphites generally, and in particular in nanoparticle form, have two serious disadvantages in the production of stretched polyester films. Firstly, they are electrically conductive, a consequence of this being drastically increased risk of flashovers in the electrostatic lay-on systems generally used (short circuits or discharges between the electrostatic lay-on equipment and the chill roll, passing through the film), and secondly the lubricating properties of the carbon blacks and graphites give rise to very poor purging behavior. This means that the purging time on changeover from black film to other types of film in production operations is longer than usual. Both disadvantages have an adverse effect on economic factors in the productivity of black films.

SUMMARY OF ADVANTAGEOUS EMBODIMENTS OF THE INVENTION

It was an object of the present invention to produce a black film with low transparency which does not have the disadvantages described, but instead can be produced economically on a large industrial scale without the risk of short circuits and of other electrical discharges in production operations and without long changeover times between one type of film and the others.

DETAILED DESCRIPTION OF ADVANTAGEOUS EMBODIMENTS OF THE INVENTION

Figure 1:
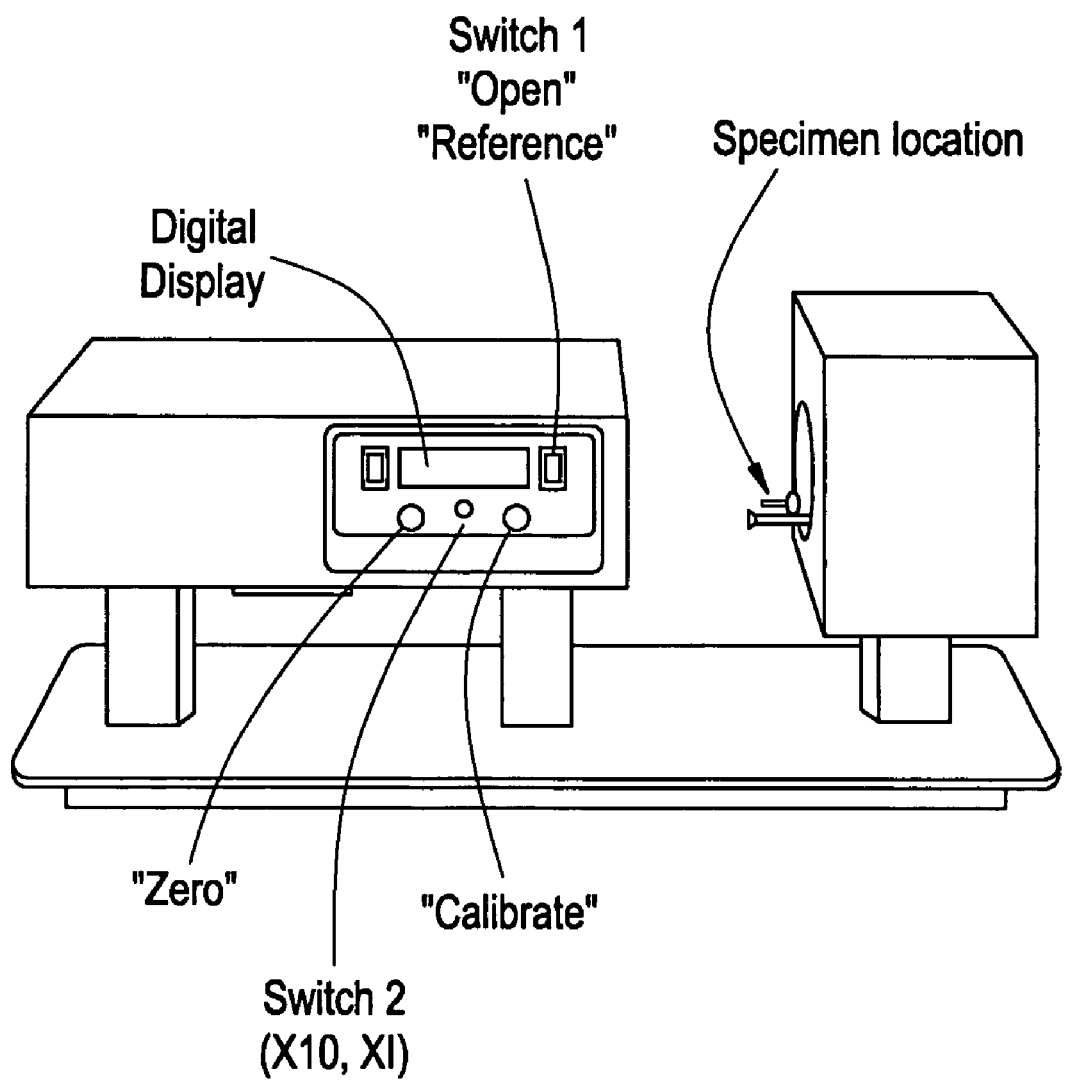
FIG. 1 is a schematic of an exemplary hazemeter which may be used to measure the haze of films in accordance with the invention.

This object is achieved via a single- or multilayer film at least one layer of which comprises, alongside polyester, an amount of from 0.5 to 75% by weight, preferably from 2 to 10% by weight, of particles comprised of iron oxide as black pigment.

The transparency (visible light) of the film is <12%, preferably <3%, and particularly preferably smaller than 0.5%. The thickness of the film is in the range from 4 to 500 µm, preferably from 8 to 200 µm, and particularly preferably from 12 to 100 µm.

According to the invention, polyesters are
homopolyesters,
copolyesters,
blends of different polyesters, the forms in which these can be used being either those of pure polymers or else those of polyesters comprising recycled material. The recycled material is usually comprised of cut material which has been produced during film production and has been repelletized.

Polyesters contain repeat units which derive from dicarboxylic acids (100 mol %) and from diols (likewise 100 mol %). The inventive polyesters are preferably based on terephthalic acid or on 2,6-naphthalenedicarboxylic acid as dicarboxylic acid component and on ethylene glycol as diol component. In another embodiment, the main diol component can also be 1,4-butanediol.

In particular, the polyesters suitable for the inventive film contain from 10 to 100 mol % of terephthalate units or from 10 to 100 mol % of 2,6-naphthalate units as dicarboxylic acid component, the total amount of dicarboxylic acid components here making up 100 mol %. Other dicarboxylic acid components which can be present in the polyester are from 0 to 50 mol % of 2,6-naphthalate in cases where terephthalate has been used as main component, or from 0 to 50 mol % of terephthalate if naphthalate has been used as main component, or from 0 to 20 mol % of isophthalate, preferably from 0.5 to 4 mol %, and also from 10 to 60 mol % of biphenyl 4,4'-dicarboxylate. The proportion of other dicarboxylic acid components, such as naphthalene-1,5-dicarboxylate, should not exceed 30 mol %, preferably 10 mol %, in particular 2 mol %, while the proportion of dicarboxylic acid components such as bibenzoate should not exceed 2 mol %.

The inventive polyester contains, as diol component, from 10 to 100 mol % of ethylene glycol (EG), the total amount of diol components here making up 100 mol %. The proportion of diethylene glycol should not exceed an amount of 10 mol %, and is ideally from 0.5 to 5 mol %. The proportion of other diol components, such as cyclohexanedimethanol, 1,3-propanediol, 1,4-butanediol, should not exceed 50 mol %. One exception is provided by the further embodiment using 1,4-butanediol as main diol component, the permissible amount of which is from 50 to 100 mol %. The proportions of other diol components are preferably in the range of less than 30 mol %, particularly preferably of less than 10 mol %.

Other embodiments of the film can comprise, alongside the main polyester constituents mentioned, polyester and black pigment, up to 40% by weight, preferably up to 10% by weight, particularly preferably up to 5% by weight, based on the weight of the film, of other polymers, such as polyetherimides, e.g. ULTEM® 1000 from GE Plastics Europe, NL, polycarbonate, such as MAKROLON® from Bayer, DE, or polyamides such as ULTRAMID® from BASF, DE, and the like.

The polyesters are generally prepared by processes known from the literature from the specified diols and dicarboxylic acid or dicarboxylic ester via polycondensation. The polyesters can be prepared either by the transesterification process using the conventional catalysts, such as the salts of Zn, of Ca, of Li, or of Mn, or by the direct esterification process. In order to eliminate side effects, the content of transesterification catalyst, based on the metal used, should not exceed 200 ppm and is preferably less than 100 ppm, particularly preferably indeed less than 50 ppm. Preferred polycondensation catalysts are antimony compounds, or germanium compounds. However, particularly preference is given to the use of titanium compounds. If antimony compounds are used, the content of antimony in one preferred embodiment is less than 210 ppm, and particularly preferably less than 70 ppm. Antimony triacetate is preferably used (an example being S21 from Atofina, France).

It is particularly preferable to use titanium-based catalysts, such as VERTEC AC420 from Johnson Matthey, or C94 from Acordis. The content of titanium here is preferably in the range below 60 ppm and particularly preferably indeed even below 20 ppm. It has also proven advantageous for the total content of all of the components of the catalyst system, such as transesterification catalysts (e.g. manganese salts) and phosphorus-containing stabilizers (e.g. polyphosphoric acid, phosphorous acid, phosphoric ester, such as ethyl phosphate, diethyl phosphate, phenyl phosphate, etc.) and polycondensation catalysts, such as titanium compounds not to exceed 200 ppm, preferably 100 ppm and particularly preferably 75 ppm.

It has proven advantageous to add stabilizers (free-radical scavengers), such as IRGANOX® 1010 or 1425 or 1222 (Ciba, Switzerland) in concentrations of from 100 to 5000 ppm during the polycondensation reaction, because this markedly reduces formation of gel particles.

The film of the invention can moreover comprise inorganic or organic additives needed to adjust surface topography. The amount of the additives used is dependent on the substances used and on their particle size. Their average particle size is generally in the range from 0.01 to 30 µm, preferably from 0.1 to 5 µm, and in particular from 0.3 to 3.0 µm.

Examples of suitable additives for achieving suitable roughness are calcium carbonate, apatite, silicon dioxide, titanium dioxide, aluminum oxide, crosslinked polystyrene, crosslinked PMMA, zeolites, and other silicates, and aluminum silicates. The amounts generally used of these additives are from 0.05 to 30% by weight, preferably from 0.1 to 1% by weight.

The black pigments for the inventive film are preferably iron oxide black pigments, preferably oxides of the formula $Fe_3O_4$ (CAS No. 1317-61-9). The amount of this $Fe_3O_4$ present in the inventive film is in the range from 0.5 to 25% by weight, preferably from 1 to 7% by weight, particularly preferably from 1.5 to 5.5% by weight. The film can comprise these pigments in the form of $Fe_3O_4$ particles. However, this embodiment is less preferred because it requires addition of amounts of from 8 to 25% by weight of $Fe_3O_4$ particles (as a function of the thickness of the film), in order to achieve the low transparency desired according to the invention. However, the reliability of running of the film during production operations is adversely affected at these high filler levels.

It has therefore proven advantageous to use inorganic particles, e.g. mica, titanium dioxide, silicon dioxide, or calcium carbonate, which have been coated with $Fe_3O_4$. Using these pigments it is possible to achieve the low transparency even with amounts of from 1 to 75% by weight of $Fe_3O_4$, while there is a decisive improvement in the reliability of running of the film. For the purposes of the invention, particular preference is given to pigments marketed as MICRONA® Matte Black and IRIODIN® 600 Black Mica and Mica Black from Merck (Darmstadt, Germany).

The inventive film can moreover comprise further black pigments in combination with the iron oxide black pigments, examples being carbon black (graphite/carbon black) or chromium/copper spinel. Particular preference is given to the combination of the iron oxide black pigments with from 0.1 to 0.5% by weight of carbon black, because this can make the perceived black color of the film even deeper. However, as mentioned at the outset, carbon black has the disadvantage of markedly prolonging purging times after production of a black film.

The inventive film is either a single- or multilayer film. The inventive multilayer films are comprised of a base layer B, and of at least one outer layer A or C, and, if appropriate, of other intermediate layers, and particular preference is given here to a three-layer A-B-C structure. For multilayer films it is also advantageous for all of the polymers used to have similar viscosity at the desired extrusion temperature. The outer layers A and/or C can, if appropriate, have further functionalities, such as sealability, high gloss, matting, color, etc.

The thickness of the outer layer(s) is selected independently of the other layers and is preferably in the range from 0.1 to 10 µm, in particular from 0.2 to 5 µm, preferably from 1 to 3 µm, and the thickness and constitution of outer layers applied on the two sides can be identical or different. The thickness of the base layer is appropriately calculated from the difference between the total thickness of the film and the thickness of the outer and intermediate layer(s) applied, and can therefore vary within wide limits, analogously with the total thickness.

In principle, the inventive black pigments can be introduced into any layer of the film. If the requirement is for high-gloss surfaces, it has proven advantageous for there to be no, or less than 0.3% by weight of, particles, inclusive of the black pigment particles, in the high-gloss layer. For sealable outer layers, it has likewise proven advantageous for there to be no, or less than 0.3% by weight of, particles, inclusive of the black pigment particles, in the sealable layer.

The film can also be coated in order to establish other properties. Typical coatings are in particular adhesive-promoting coatings, antistatic coatings, and coatings which improve slip or have release action. Clearly, these additional coatings can be applied to the film by way of in-line coating by means of aqueous dispersions after longitudinal stretching and prior to transverse stretching.

The process for production of the film provides that the raw materials for the film are melted in extruders and homogenized and extruded via a flat-film die onto a chill roll, where they are cooled to give a prefilm, and that the prefilm is then longitudinally and transversely stretch-oriented, and heat-set, and finally wound up.

If twin- or multiscrew extruders are used in the film-production machinery, then in principle all of the starting materials can be fed directly into the extruder.

It has generally proven advantageous for the black pigments to be incorporated prior to film extrusion, into a polyester in the form of a masterbatch. This masterbatch comprises from 1 to 80% by weight of $Fe_3O_4$ and from 99 to 20% by weight of polymer. The content of $Fe_3O_4$ in this polyester masterbatch is particularly preferably from 10 to 50% by weight. The $Fe_3O_4$-containing pigments can be introduced here into the polymer before preparation from the monomers is complete (the preparation of polyesters above), or in the form of particles into the polymer in a multiscrew extruder (extrusion masterbatch), by known processes, and this has proven particularly successful in the case of relatively high particle concentrations greater than 10% by weight.

The raw materials are preferably predried, but the drying process can be omitted when twin- or multiscrew extruders are used in the extrusion process. The predrying involves gradual heating of the masterbatches under reduced pressure of from 20 to 80 mbar, preferably of from 30 to 60 mbar, in particular of from 40 to 50 mbar, and also stirring and, if appropriate, after-drying at a constant, elevated temperature, preferably likewise under reduced pressure. The masterbatches are preferably metered at room temperature from a feed vessel in the desired blend together with the polyester and, if appropriate, with other raw material components in batches into a vacuum dryer which during the course of the drying time or residence time traverses a temperature profile from 10 to 160° C., preferably from 20 to 150° C., in particular from 30 to 130° C. During the residence time of about 6 hours, preferably 5 hours, in particular 4 hours, the raw material mixture is stirred at from 10 to 70 rpm, preferably at from 15 to 65 rpm, in particular at from 20 to 60 rpm. The resultant precrystallized or predried raw material mixture is after-dried in a downstream container, likewise evacuated, at from 90 to 180° C., preferably from 100 to 170° C., in particular from 110 to 160° C., for from 2 to 8 hours, preferably from 3 to 7 hours, in particular from 4 to 6 hours.

However, if twin- and multiscrew extruders are used, the masterbatches, and also the other raw materials, can also be extruded directly, without predrying.

The preferred extrusion or coextrusion process for production of the film is that the melts corresponding to the individual layers of the film are extruded or, respectively, coextruded via a flat-film die, and are quenched in the form of a substantially amorphous prefilm on a chill roll. In the case of a single-layer film, only one melt is accordingly extruded through the die. This film is then reheated and stretch-oriented ("oriented") longitudinally and transversely or transversely and longitudinally or longitudinally, transversely, and again longitudinally and/or transversely. The film temperatures in the stretching process are generally above the glass transition temperature $T_g$ of the polyester used by from 10 to 60° C., and the longitudinal stretching ratio is usually from 2.0 to 6.0, in particular from 2.0 to 3.5, the transverse stretching ratio being from 2.0 to 5.0, in particular from 3.0 to 4.5, the ratio for any second longitudinal and transverse stretching carried out being from 1.1 to 5.0. The first longitudinal stretching can also be carried out simultaneously with the transverse stretching, in the form of simultaneous stretching.

After stretch orientation the film is heat-set at oven temperatures of from 180 to 260° C., in particular from 220 to 250° C. The film is then cooled and wound up.

In one preferred embodiment, the heat-setting takes place at from 160 to 250° C., and the film is preferably relaxed transversely at this temperature by at least 1%, preferably by at least 2%, particularly preferably by at least 4%.

In another preferred embodiment, the film is stretched simultaneously longitudinally and transversely by a factor of at least 3.0, and the stretching here takes place in a simultaneous frame. The heat-setting takes place at temperatures in the range from 160 to 250° C., and the film can be relaxed at these temperatures transversely and preferably also longitudinally.

The inventive single- or multilayer films have the desired low transparencies and, surprisingly, there was also a shortening, by at least 50% when comparison is made with films using carbon black, of the purging times in changeovers between types in production operations.

The following standards or methods are used here for testing individual properties.

Test Methods

Testing of Transparency and Haze

A BYK Gardner Hazegard Hazemeter XL-211 is used for the test. An exemplary Hazemeter for testing in accordance with the invention is schematically illustrated in FIG. 1. The test equipment is to be switched on 30 minutes prior to the test. Care is to be taken that the light beam passes centrally through the sphere to the output aperture.

Production, Shape, and Number of Specimens 5 specimens of size 100×100 mm are cut out from each of the films to be studied. The longitudinal and transverse direction are marked on the margin, because tests take place in both machine directions.

Testing of Transparency and Haze
Press switch 1 "OPEN"
Set switch 2 to "x10" and calibrate digital display to 0.00, using the "Zero" knob
Move switch 1 to "Reference" and switch 2 to "x1"
Bring the digital display to 100, using the "Calibrate" knob
Insert specimen longitudinally
Read-off displayed transparency value
Calibrate the digital display to 100, using the "Calibrate" knob
Set switch 1 to "OPEN"
Read-off displayed value for longitudinal haze
Rotate specimen to transverse direction
Read-off displayed value for transverse haze Evaluation Transparency and haze are obtained by averaging the respective 5 individual values.

INVENTIVE EXAMPLES

Film Production

Polyester chips were mixed in the ratios stated in the examples and dried for 2 hours at 140° C., and melted in extruders, in the case of monofilm in a single-screw extruder, and in the case of coextruded film respectively in twin-screw extruders. The molten polymer extrudate(s) was/were extruded through a die. In the case of coextrusion, the polymer extrudates were combined in a coextrusion die. The polymer extrudate(s) was/were drawn off by way of a take-off roll whose temperature was 20° C., to give a prefilm. The prefilm was stretched by a factor of 3.5 in the machine direction at 116° C. (=film temperature in stretching gap), and then transverse stretching by a factor of 3.6 was carried out in a frame at a temperature of 110° C. The film was then heat-set at 210° C. and relaxed transversely by 3% at temperatures of from 216 to 200° C. and again by 1% at temperatures of from 180 to 150° C. The production speed (final film speed) was 150 m/min.

The following polymers were used in the examples:

Polymer P1
100% by weight of RT49 polyethylene terephthalate from Kosa (Germany)

Polymer P2
10% by weight of MICRONA® Matte Black from Merck KGaA (Germany) and 90% of polyethylene terephthalate of P1. The pigments were added during preparation of the polymer from the monomers dimethyl terephthalate and ethylene glycol. Content of $Fe_3O_4$ was 7% by weight.

Polymer P3
50% by weight of MICRONA® Matte Black from Merck KGaA (Germany) and 50% of polyethylene terephthalate of P1. The pigments were added in a commercially available Leistritz twin-screw extruder (ZSE 40 HP-44D). Content of $Fe_3O_4$ was 35.5% by weight.

Polymer P4

Polyethylene terephthalate masterbatch with 20% by weight of NE9AAA17693 Renol Black (Clariant/Germany) carbon black Polymer P5

10% by weight of IRIODIN® 600 Black Mica from Merck KGaA (Germany) and 90% by weight of polyethylene terephthalate of P1. The pigments were added during preparation of the polymer from the monomers dimethyl terephthalate and ethylene glycol. Content of $Fe_3O_4$ was 5% by weight.

Polymer P6

Polyethylene terephthalate having 22 mol % of IPA (isophthalic acid) from Kosa (Germany).

Polymer P7

98% by weight of polyethylene terephthalate and 2% of $SiO_2$ (SYLOBLOC® 44H with $D_{50}$=2.7 from Grace, Germany)

Monofilms and three-layer films were produced as described under "film production".

The film from Example 6 is sealable.

The raw material constitution of the film and its properties can be found in the tables below.

| Example | P1 in % | P2 in % | P3 in % | P4 in % | P5 in % | P6 in % | P7 in % | Total thickness in μm | Transparency in % |
|---|---|---|---|---|---|---|---|---|---|
| 1 |  | 100 |  |  |  |  |  | 25 | 0.3 |
| 2 | 80 |  | 20 |  |  |  |  | 25 | 0.5 |
| 3 |  |  |  |  | 100 |  |  | 25 | 0.4 |
| 4 |  | 100 |  |  |  |  |  | 100 | 0.06 |
| 5 | 78 |  | 20 | 2 |  |  |  | 40 | 0.2 |

| Example | Layer | P1 | P5 | P6 | P7 | Thickness of layer in μm | Transparency in % |
|---|---|---|---|---|---|---|---|
| 6 | A | 90 |  |  | 10 | 4 | 0.2 |
|  | B |  | 100 |  |  | 40 |  |
|  | C |  |  | 100 |  | 4 |  |

The invention claimed is:

1. A single- or multilayer, extruded or co-extruded oriented black film comprising polyester and at least one inorganic black pigment, said film including at least one layer which comprises, alongside polyester, an amount of from 0.5 to 75% by weight of black pigment, said black pigment consisting of inorganic particles selected from mica, silicon dioxide or calcium carbonate that have been coated with $Fe_3O_4$, said film further exhibiting a transparency in visible light of less than 12%.

2. The film as claimed in claim 1, said film comprising an amount of from 2 to 10% by weight of black pigment comprising particles derived from iron oxide.

3. The film as claimed in claim 1, said film having a thickness in the range from 4 to 500 μm.

4. The film as claimed in claim 1, wherein said polyester is derived from terephthalic acid or 2,6-naphthalene-dicarboxylic acid as dicarboxylic acid component and ethylene glycol or 1,4-butanediol as diol component.

5. The film as claimed in claim 1, wherein said polyester further comprises an amount of up to 30 mol %, of 1,5-naphthalenedicarboxylate or an amount of tip to 2 mol % of bibenzoate, based in each case on the entire molar amount of dicarboxylic acid component.

6. The film claimed in claim 1, said film further comprising an amount of from 0.05 to 30% by weight of inorganic or organic additives whose average particle size is in the range from 0.01 to 30μm.

7. The film as claimed in claim 6, wherein said additives are selected from calcium carbonate, apatite, silicon dioxide, titanium dioxide, aluminum oxide, crosslinked polystyrene, crosslinked PMMA, zeolites, and silicates.

8. The film as claimed in claim 1, wherein said black pigment is present in an amount in the range from 0.5 to 25% by weight and said black pigment is derived from oxides of the formula $Fe_3O_4$.

9. The film as claimed in claim 1, said film further comprising an amount of from 0.1 to 0.5% by weight based on the weight of the film, of additional black pigment selected from carbon black or chromium/copper spinel.

10. A process for production of a film as claimed in claim 1, said process comprising melting and homogenizing the raw material for the film in an extruder, extruding the homogenized raw material through a flat-film die onto a chill roll and cooling to give a preflim, longitudinally and transversely stretch-orienting the prefilm, and heat-setting the stretch-oriented film, wherein said process further comprises forming the raw material by incorporating black pigment into polyester in the form of a masterbatch that comprises from 1 to 80% by weight of $Fe_3O_4$ black pigment and from 99 to 20% by weight of polyester polymer, said raw material forming step performed prior to said melting step.

11. The process as claimed in claim 10, wherein the raw materials are predried by heating the masterbatch under a reduced pressure of from 20 to 80 mbar while stirring and, optionally, after-drying at a constant temperature.

12. A composite comprising a film as claimed in claim 1.

13. An extruded or co-extruded black film comprising one or more layers, said layer(s) comprising polyester and at least one inorganic black pigment, said black pigment comprising inorganic particles that have been coated with $Fe_3O_4$ said $Fe_3O_4$ present in said film in a total amount ranging from 0.5 to 7% by weight, said extruded or coextruded film further exhibiting a transparency in visible light of less than 0.5%, wherein said transparency is solely attributed to the layer(s) containing the inorganic particles that have been coated with $Fe_3O_4$.

14. An extruded or co-extruded oriented black film as claimed in claim 13, said film comprising polyester and a black pigment mixture, said film including at least one layer which comprises, alongside polyester, a black pigment mixture comprising from 0.5 to 7% by weight of inorganic particles that have been coated with $Fe_3O_4$ and from 0.1 to 0.5 % by weight of carbon black.

15. A multilayer film as claimed in claim 13, said film comprising a base layer and at least one outer layer, said film comprising (i) polyester and (ii) at least one inorganic black pigment comprising inorganic particles that have been coated with $Fe_3O_4$, wherein said inorganic black pigment is present in said base layer alone and said at least one outer layer is selected from a sealable layer, matt layer or colored layer.

* * * * *

UNITED STATES PATENT AND TRADEMARK OFFICE
CERTIFICATE OF CORRECTION

| | | |
|---|---|---|
| PATENT NO. | : 7,396,587 B2 | Page 1 of 1 |
| APPLICATION NO. | : 11/407304 | |
| DATED | : July 8, 2008 | |
| INVENTOR(S) | : Kliesch et al. | |

It is certified that error appears in the above-identified patent and that said Letters Patent is hereby corrected as shown below:

Column 8
Claim 5, Line 3, delete "tip" insert --up--
Claim 10, Line 40, delete "preflim" insert --prefilm--

Signed and Sealed this

Sixteenth Day of September, 2008

JON W. DUDAS
*Director of the United States Patent and Trademark Office*